(12) United States Patent
Firzlaff et al.

(10) Patent No.: US 7,234,749 B1
(45) Date of Patent: Jun. 26, 2007

(54) TAILGATE STRUCTURE FOR RECEIVING SUPPLEMENTAL TAILGATE

(75) Inventors: Jeff Firzlaff, Royal Oak, MI (US); Duane Koehler, Livonia, MI (US); Kian-Huat Tan, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 11/358,229

(22) Filed: Feb. 21, 2006

Related U.S. Application Data (60) Provisional application No. 60/743,277, filed on Feb. 10, 2006.

(51) Int. Cl.
*B62D 25/00* (2006.01)
(52) U.S. Cl. .................. 296/57.1; 296/26.08
(58) Field of Classification Search ............... 296/57.1, 296/26.05, 26.04
See application file for complete search history.

(56) References Cited

U.S. PATENT DOCUMENTS

| | | | | |
|---|---|---|---|---|
| 6,045,172 | A * | 4/2000 | Thomas et al. | 296/26.1 |
| 6,364,392 | B1 * | 4/2002 | Meinke | 296/57.1 |
| 6,454,338 | B1 * | 9/2002 | Glickman et al. | 296/57.1 |
| 6,908,134 | B1 * | 6/2005 | Summers | 296/57.1 |
| 6,918,624 | B2 * | 7/2005 | Miller et al. | 296/26.1 |
| 6,923,488 | B2 * | 8/2005 | Bruford et al. | 296/57.1 |
| 6,932,404 | B2 * | 8/2005 | Vejnar | 296/57.1 |
| 6,935,671 | B2 * | 8/2005 | Bruford et al. | 296/57.1 |
| 6,966,595 | B2 * | 11/2005 | Bruford et al. | 296/57.1 |
| 6,983,972 | B2 * | 1/2006 | Tan et al. | 296/57.1 |
| 6,988,756 | B1 * | 1/2006 | Meinke et al. | 296/26.08 |
| 6,991,277 | B1 * | 1/2006 | Esler | 296/26.08 |
| 6,994,363 | B2 * | 2/2006 | Seksaria et al. | 296/26.1 |
| 7,070,222 | B2 * | 7/2006 | Bruford et al. | 296/57.1 |
| 7,090,276 | B1 * | 8/2006 | Bruford et al. | 296/26.1 |
| 2005/0088848 | A1 * | 4/2005 | Miller et al. | 362/485 |

* cited by examiner

*Primary Examiner*—Kiran B. Patel
(74) *Attorney, Agent, or Firm*—Gigette M. Bejin; Miller Law Group, PLLC (57) ABSTRACT

A tailgate structural configuration accommodates the housing of a supplemental tailgate internally within the tailgate. The tailgate is formed with an outer panel and an inner panel to define an internal cavity. The upper portion of the tailgate includes a C-channel frame member connected to both the inner and outer panels to support guide tubes telescopically housing the supplemental tailgate. To enhance structural stability, the tailgate further includes one or two transversely oriented strainers having formed therein flanged depressions or openings for the passage of the guide tubes vertically therethrough. Each guide tube is affixed to a mounting bracket that is detachably connected to the C-channel to support the guide tube within the tailgate. Positioning pins mounted on the mounting bracket affixed to the guide tubes engage locator holes in the C-channel for positioning the supplemental tailgate.

9 Claims, 10 Drawing Sheets

TAILGATE STRUCTURE FOR RECEIVING SUPPLEMENTAL TAILGATE

CROSS-REFERENCE TO RELATED APPLICATIONS

This application claims domestic priority on U.S. Provisional Patent Application Ser. No. 60/743,277, filed on Feb. 10, 2006, and entitled "Modified Tailgate to House a Supplemental Tailgate", the contents of which are incorporated herein by reference.

FIELD OF THE INVENTION

This invention relates to the utilization of a supplemental tailgate apparatus housed with the tailgate of a pick-up truck and, more particularly, to structural modifications made to the tailgate assembly to receive a supplemental tailgate apparatus for deployment therefrom.

BACKGROUND OF THE INVENTION

Conventionally, pickup trucks include a tailgate at the back of a bed that closes off a cargo box. Often times, the truck bed is not long enough to hold the cargo, so truck bed extenders have been developed. The truck bed extenders work in conjunction with the open tailgate in order to provide additional length to the bed. Some of the bed extenders mount to the outside of the tailgate or to the box itself, which may be convenient for deployment, but they tend to interfere with cargo space in the box since the bed extender, when not in use, protrudes into the box. Moreover, it is typical for the vehicle operator to employ the extender only occasionally, so it is generally undesirable to have the extender exposed at all times, which detracts from the attractiveness of the vehicle.

Additionally, it is sometimes desirable to have an extender that can provide other functions in addition to a bed extender, such as a box extender function—an upwardly extending structure from the rearmost edge of an open tailgate that mimics the function of a closed tailgate. Such arrangements are particularly useful for carrying a load that is longer than the bed, but needs rearward support, such as provided by a closed tailgate, in order to prevent the load from falling rearwardly off the pick-up truck. Again, though, typical box extenders that provide adequate functionality are externally mounted and not only detract from the vehicle appearance when not in use but also require changes to the box for mounting such extenders. Also, most of these types of extenders are very cumbersome to deploy and later stow away, thus being undesirable for the operator to use. Such functions may be provided with simple ergonomic operation of the assembly, while still allowing for an attractive appearance for the vehicle when the extender is stowed during periods of non-use. Thus, while the exterior mounted extenders may be able to perform multiple functions, they still suffer from the drawbacks of an unattractive appearance and taking up room in the bed even when not in use.

Positioning the extended supplemental tailgate structure generally perpendicularly to the plane of the main tailgate structure, while the main tailgate structure is moved to an open position such that the plane of the tailgate structure is substantially parallel to the bed of the pickup truck, places the extended supplemental tailgate structure in an orientation that is substantially parallel to the main tailgate structure when the main tailgate structure is in a normal closed position. In such an extended position, the supplemental tailgate can provide a restriction to the rearward movement of objects located on the bed of the pickup truck. Furthermore, such an extended position of the supplemental tailgate can provide support for objects placed on top of the supplemental tailgate.

Positioning the extended supplemental tailgate structure such that the supplemental tailgate structure hangs below the plane of the main tailgate structure permits the cross member of the supplemental tailgate to be utilized as a step. In fact, U.S. Pat. No. 6,918,624, granted on Jul. 19, 2005, teaches that the cross member of the supplemental tailgate apparatus can incorporate a flip-out step that enlarges the surface of the underside of the cross member of the supplemental tailgate structure to enhance the use thereof as a step. Such utilization of the supplemental tailgate apparatus assists the operator in gaining physical access to the cargo area of the pick-up truck, which is particularly helpful whenever the bed of the pick-up truck to positioned substantially above the ground surface.

Such a supplemental tailgate apparatus is preferably housed within the interior of the main tailgate structure so that the supplemental tailgate apparatus is retracted into the interior of the main tailgate when not being utilized as either a step and/or as a cargo area extension device, and, as a result, the main tailgate with a retracted supplemental tailgate apparatus looks substantially the same as a conventional tailgate assembly. The conventional main tailgate assembly, however, because of internal structural members and the configuration of the conventional main tailgate assembly, cannot receive the movable supplemental tailgate apparatus without undergoing some structural modifications.

Accordingly, it would be desirable to provide a main tailgate assembly on a pick-up truck that would be capable of receiving a supplemental tailgate apparatus in a manner to allow the operation of the supplemental tailgate apparatus in the various desired functions.

SUMMARY OF THE INVENTION

It is an object of this invention to overcome the aforementioned disadvantages of the known prior art by providing structural modifications within the main tailgate structure to permit the mounting of a supplemental tailgate apparatus internally of the main tailgate assembly on a pick-up truck.

It is a feature of this invention that the main tailgate structure is provided with a C-channel member or reinforcement member positioned at the top or near the top of the main tailgate assembly to be engaged by the inner and outer tailgate panels and provide structural support at the top of the main tailgate assembly for the mounting of a supplemental tailgate apparatus.

It is an advantage of this invention that the C-channel member or reinforcement member may have a pair of upright legs that support, respectively, the inner and outer main tailgate panels.

It is another advantage of this invention that the upright legs of the C-channel member or reinforcement member are capable of engagement with the inner and outer panels of the main tailgate structure through welding, riveting or a hemming process.

It is still another feature of this invention that the C-channel or reinforcement member may include a horizontal web member oriented orthogonally to the upright legs to permit the mounting of the supplemental tailgate apparatus and increase section modulus.

It is another feature of this invention that the main tailgate assembly has at least one internal transverse reinforcement member spanning between and supporting the inner and outer panels of the main tailgate assembly.

It is still another feature of this invention that each internal transverse support member is formed with a depression notch to permit a guide tube or the like to pass through the internal transverse support member.

It is yet another advantage of this invention that the guide tubes or the like that receive the supplemental tailgate structure are detachably mounted by fasteners or the like to the main tailgate structure at both the top and the bottom of the respective guide member.

It is yet another feature of this invention that each guide tube or the like is affixed to a mounting bracket at the top of the guide tube to permit the detachable connection thereof to the C-channel member or reinforcement member at the top of the main tailgate assembly.

It is still another advantage of this invention that a mounting bracket for supporting a grab handle mechanism may be incorporated into the internal modifications around a guide tube to provide support for the deployment of a grab handle to be utilized in conjunction with deployment of the supplemental tailgate apparatus when being utilized as a step function.

It is a further advantage of this invention that the mounting bracket for detachably connecting the guide tube to the C-channel can be welded directly to the guide tube.

It is another object of this invention to provide a main tailgate assembly that will permit the receipt of and deployment of a supplemental tailgate apparatus from the interior of a main tailgate assembly while maintaining the conventional appearance of the main tailgate assembly for a pick-up truck.

It is still another object of this invention to support in a rigid manner a supplemental tailgate apparatus within the interior of a main tailgate assembly without incurring rattles resulting from an interfering supplemental tailgate apparatus.

It is a further object of this invention to provide a main tailgate assembly for use with a supplemental tailgate apparatus that is durable in construction, inexpensive of manufacture, carefree of maintenance, facile in assemblage, and simple and effective in use.

These and other objects, features and advantages are accomplished according to the instant invention by providing a tailgate structural configuration that accommodates the housing of a supplemental tailgate internally within the tailgate. The tailgate is formed with an outer panel and an inner panel to define an internal cavity. The upper portion of the tailgate includes a C-channel frame member or the like, such as a reinforcement member, connected to both the inner and outer panels to support guide tubes housed in the supplemental tailgate. To enhance structural stability, the tailgate further includes one or two transversely oriented strainers having formed therein flanged depressions or openings for the passage of the guide tubes vertically therethrough. Each guide tube is affixed to a mounting bracket that is detachably connected to the C-channel member or reinforcement member to support the guide tube within the tailgate. Positioning pins mounted on the mounting bracket affixed to the guide tube engage locator holes in the C-channel for positioning the supplemental tailgate.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Referring to FIGS. 1-4, a tailgate assembly for pivotally mounting on a pick-up truck cargo bed incorporates the principles of the instant invention. Any left and right references are used as a matter of convenience and are determined by standing at the rear of the cargo bed where the tailgate is pivotally mounted and facing the cargo bed, the normal direction of travel of the pick-up truck. The tailgate assembly 10 is configured for the mounting of a supplemental tailgate apparatus 20 of the type disclosed in U.S. Pat. No. 6,918,624, granted on Jul. 19, 2005, to Scott Miller, et al, the contents of which are incorporated herein by reference in its entirety. Furthermore, the supplemental tailgate apparatus 20 can have associated therewith an optional grab handle device (not shown), which is disclosed in U.S. patent application Ser. No. 11/236,133, of Steve Bruford, et al, entitled "Grab Handle for Use with Supplemental Tailgate on Pick-Up Trucks", now U.S. Pat. No. 7,090,276, granted on Aug. 15, 2006, the contents of which are incorporated herein in its entirety by reference.

Figure 1:
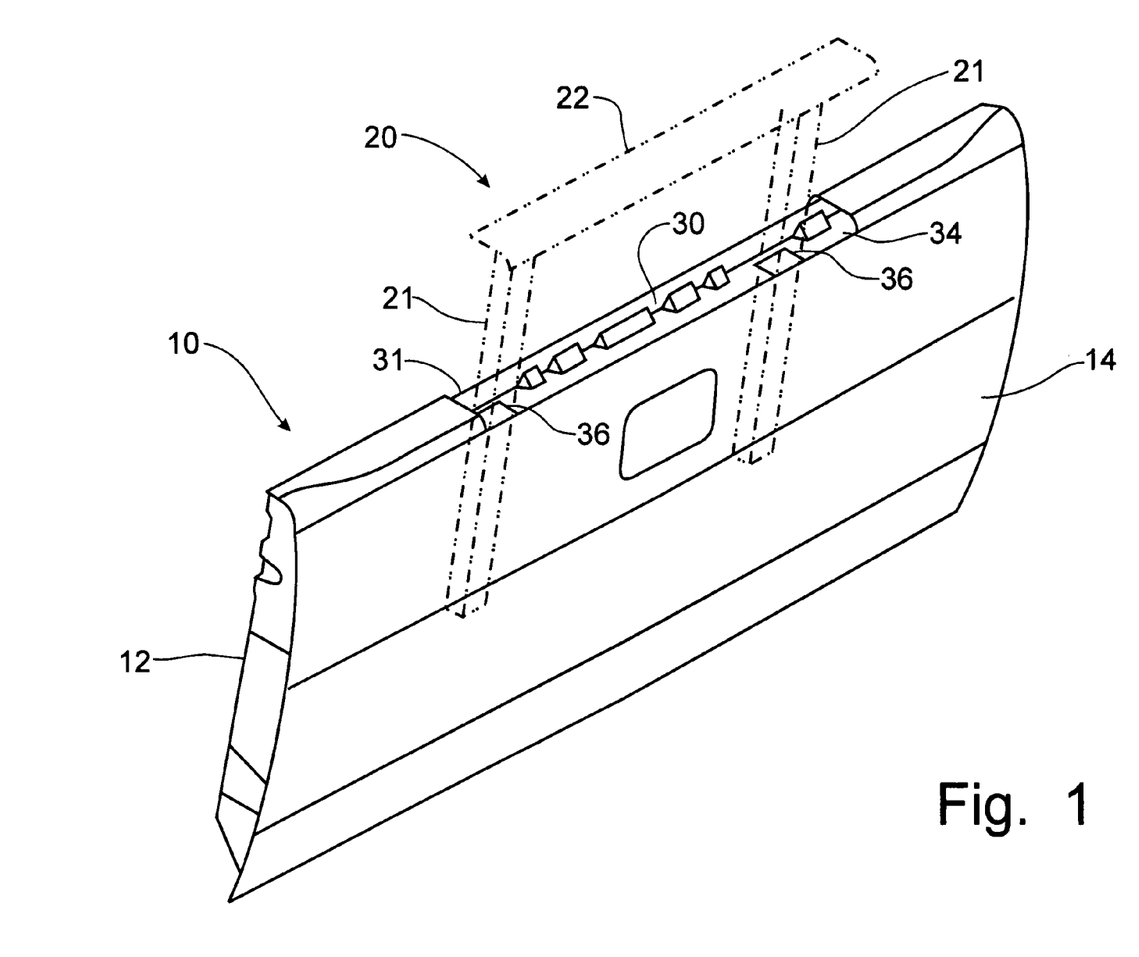
FIG. 1 is a perspective view of a tailgate for the cargo bed of a pick-up truck incorporating the principles of the instant invention, the extendable supplemental tailgate apparatus being shown in phantom elevated above the tailgate assembly.
Figure 2:
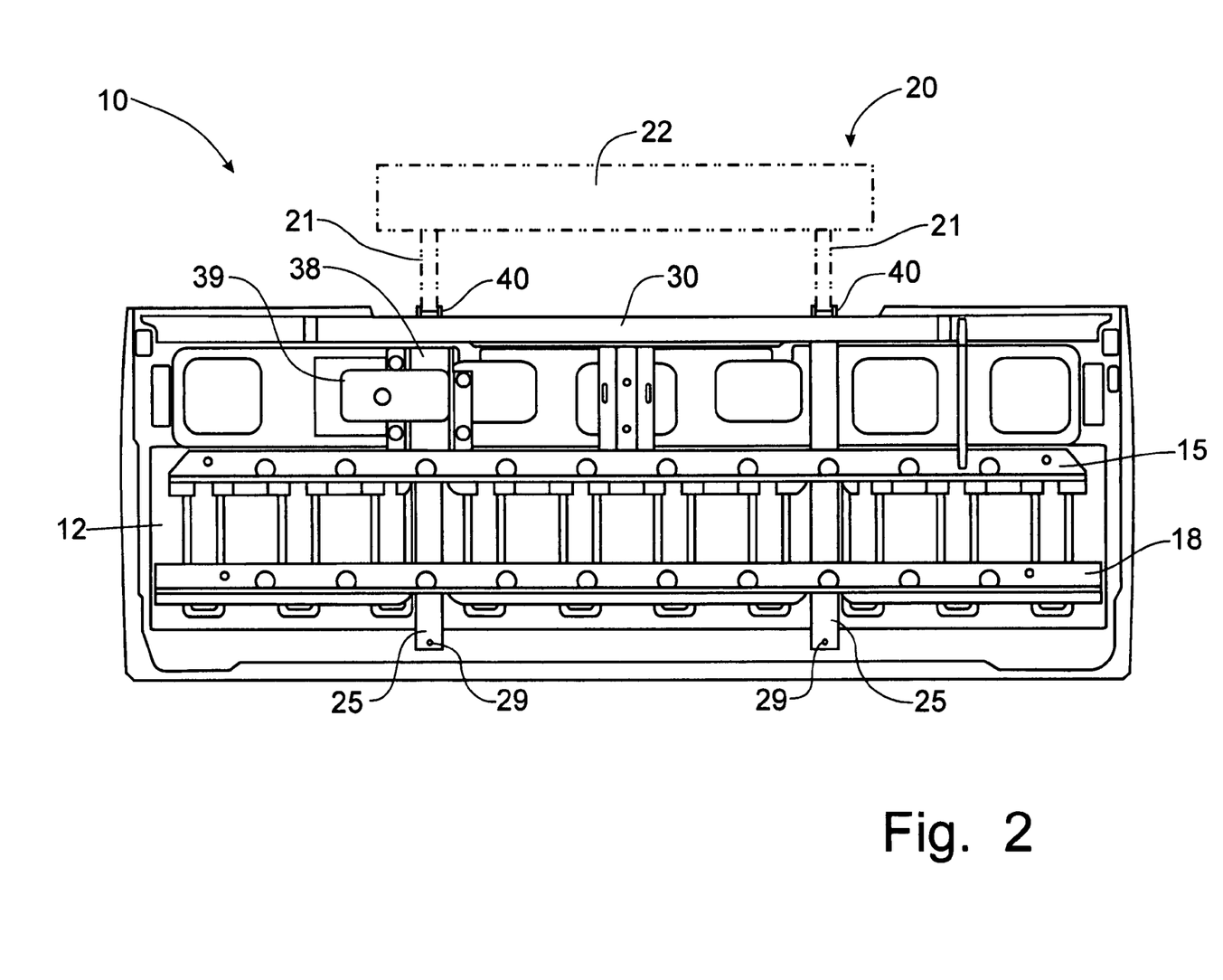
FIG. 2 is an elevational view of the tailgate assembly looking from the aspect of the outer panel with the outer panel being removed to depict the internal structure of the tailgate assembly, the supplemental tailgate apparatus being shown in phantom in a partially raised position.
Figure 3:
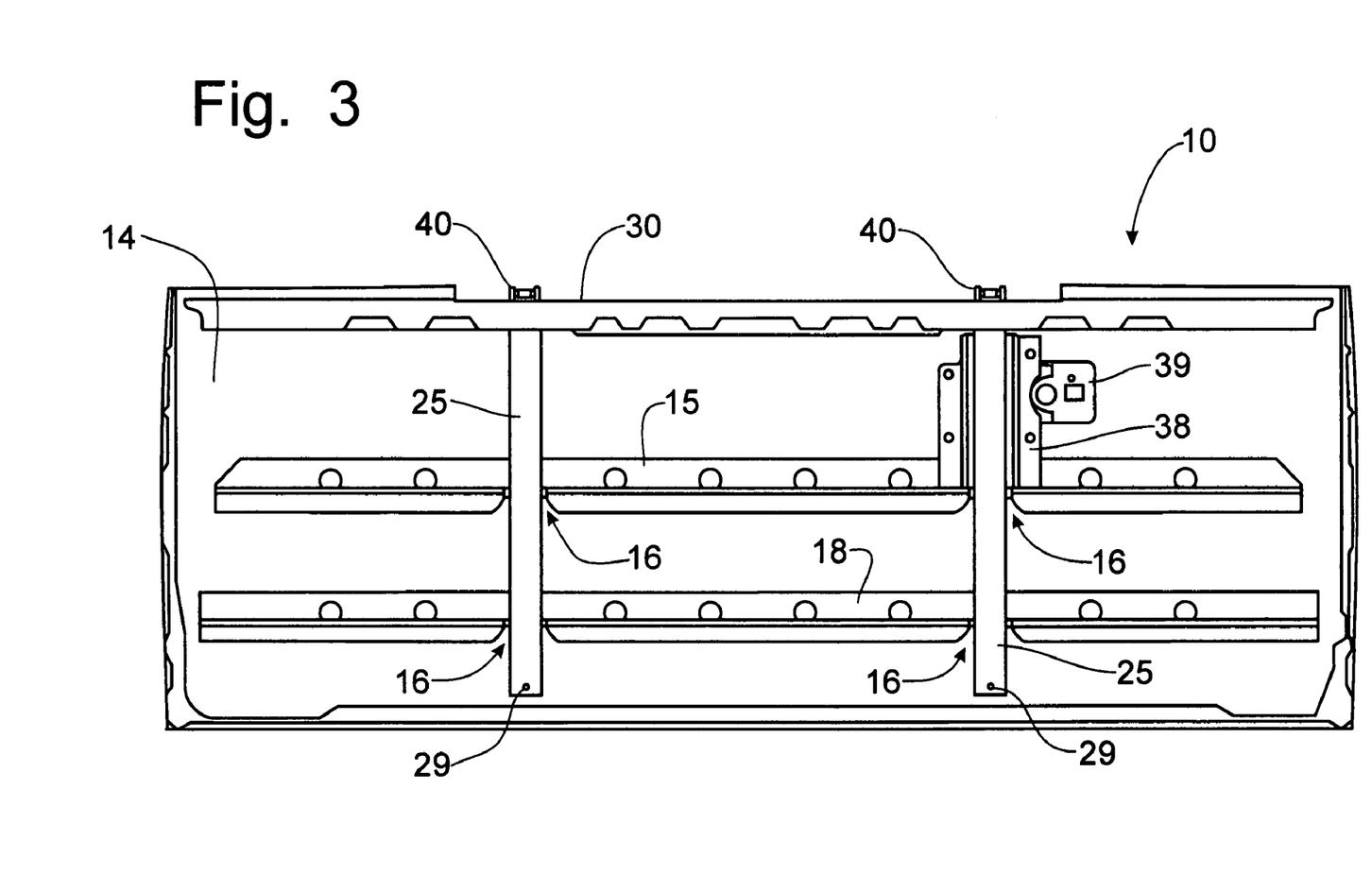
FIG. 3 is an elevational view of the tailgate assembly looking from the aspect of the inner panel with the inner panel removed to depict the internal structure of the tailgate assembly.
Figure 4:
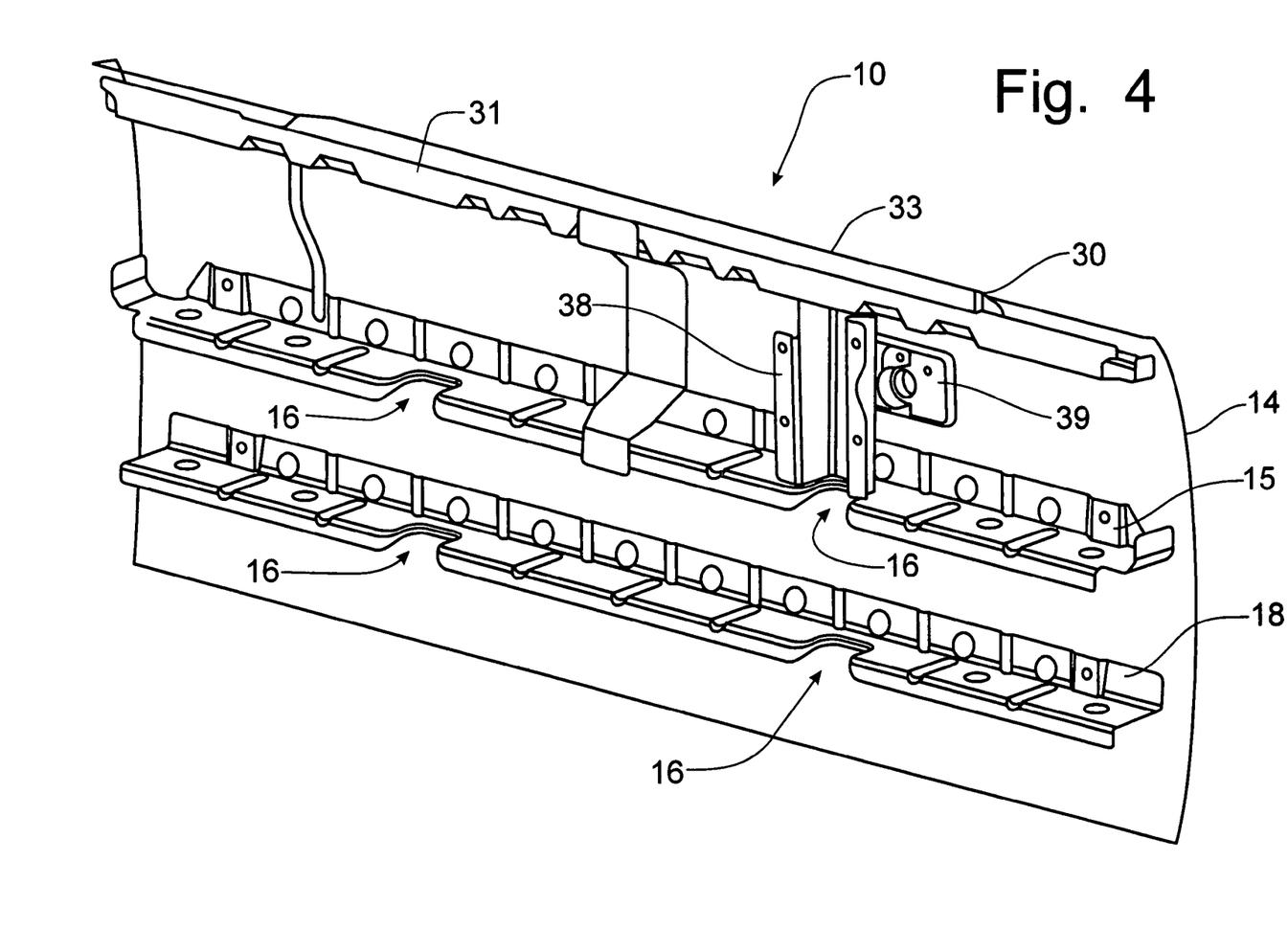
FIG. 4 is a perspective view of the tailgate assembly with the inner panel removed, as depicted in FIG. 3.
Figure 5:
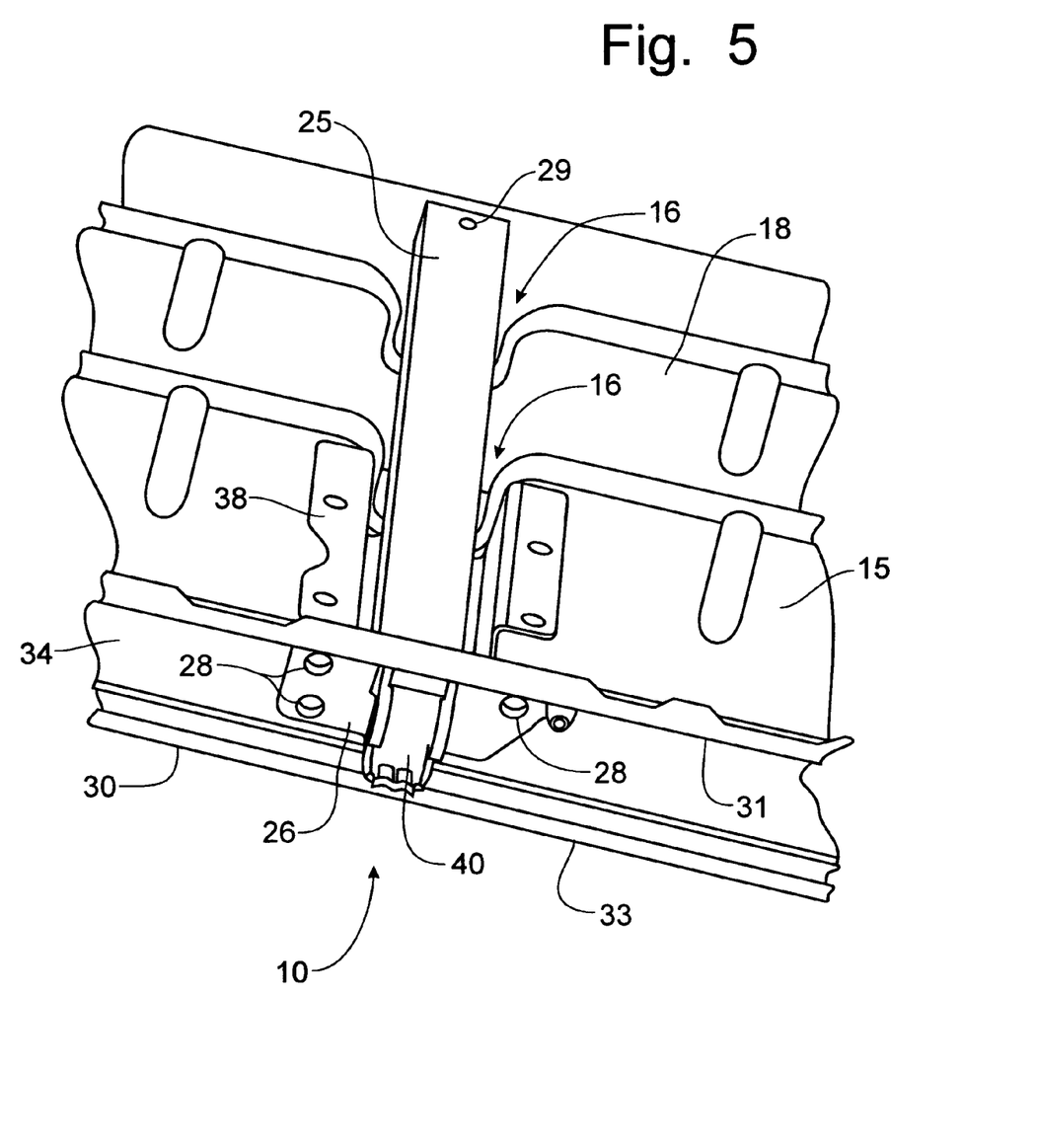
FIG. 5 is an enlarged partial top perspective detail view, taken from the aspect of the inner panel, of a guide tube mounted on the C-channel and received through the strainers for mounting at the bottom of the tailgate assembly, the mounting bracket for the optional grab handle being shown mounted to the C-channel.
Figure 6:
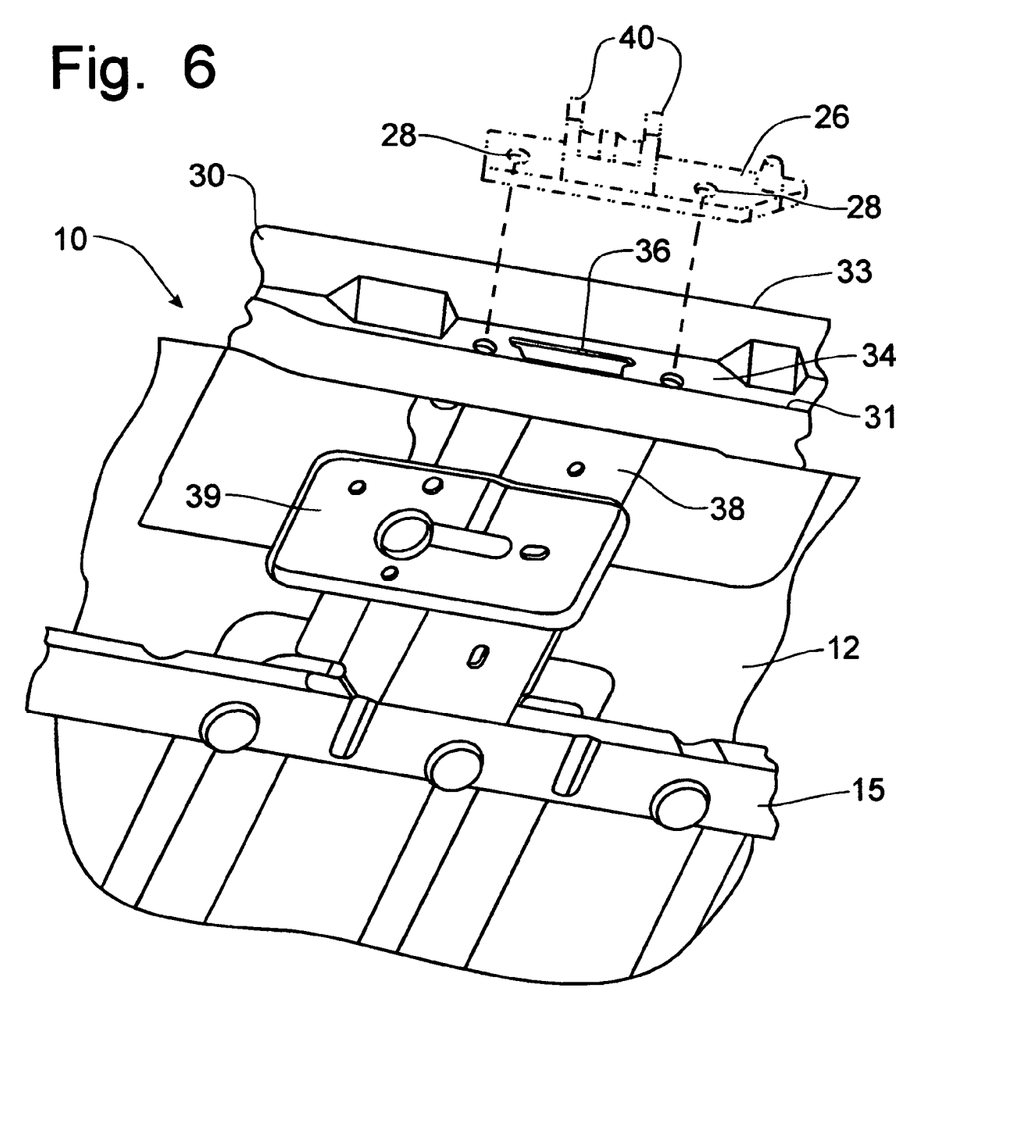
FIG. 6 is an enlarged partial perspective detail view, taken from the aspect of the outer panel, of the C-channel and first strainer with the mounting bracket for the optional grab handle depicted, the mounting bracket for the guide tube being shown in phantom exploded away from the C-channel.
Figure 7:
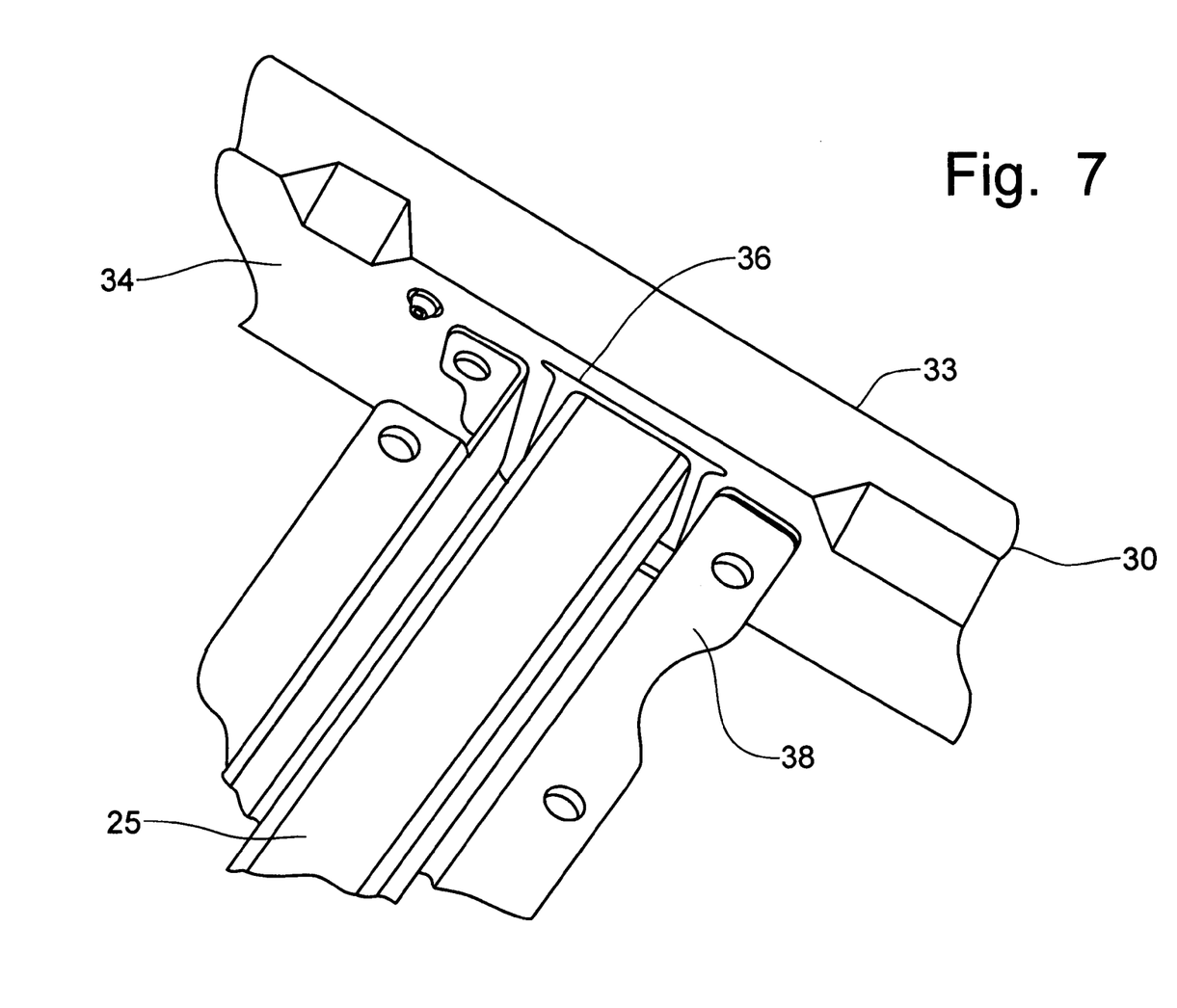
FIG. 7 is an enlarged partial perspective detail view of the C-channel, guide tube and grab handle mounting bracket taken from the aspect of the inner panel.
Figure 8:
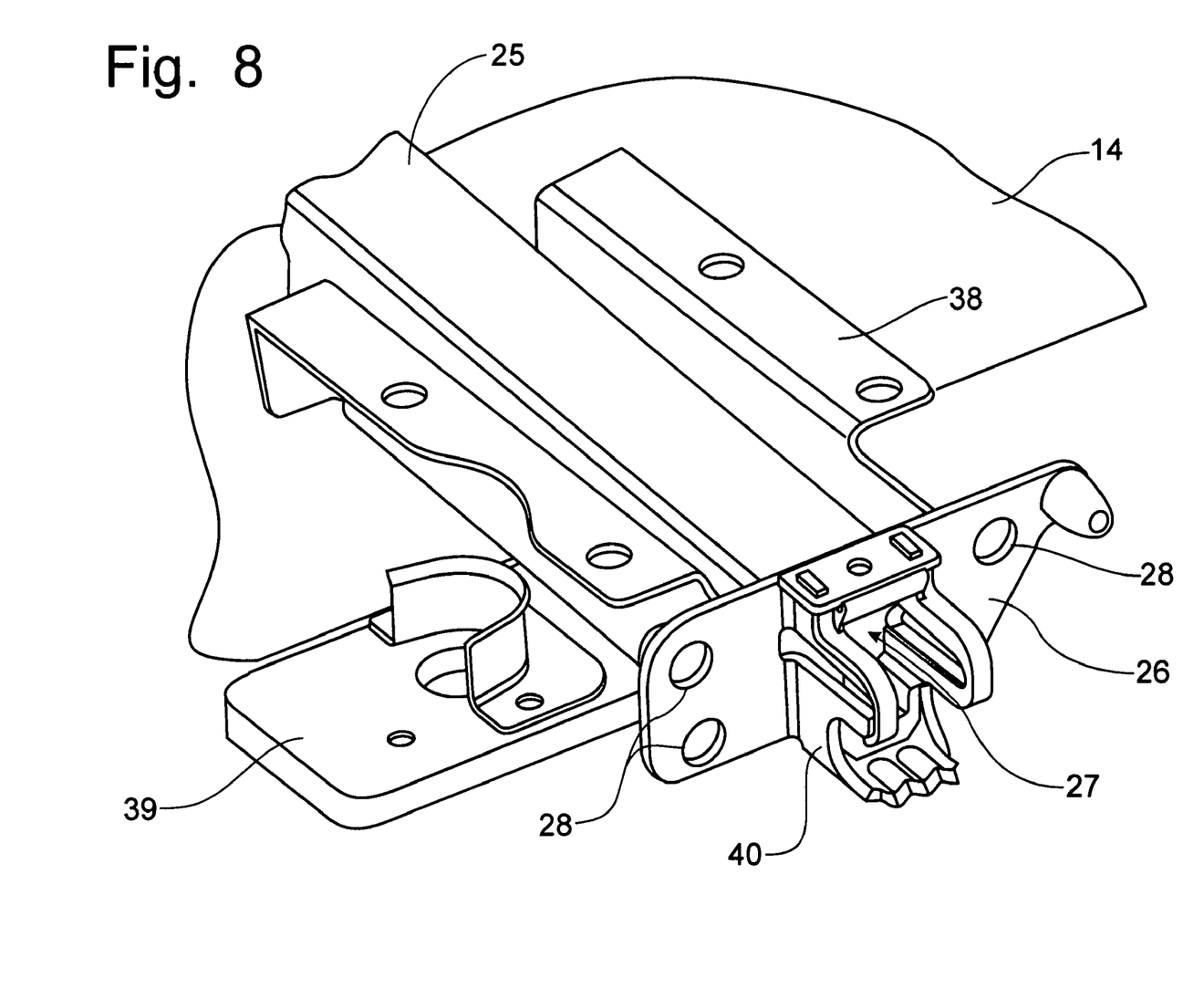
FIG. 8 is an enlarged partial perspective detail view of the guide tube with mounting bracket and the grab handle mounting bracket, with the C-channel being removed for purposes of clarity.

The pick-up truck is conventionally manufactured with a cargo bed forming the rearward portion of the vehicle. The cargo bed generally includes generally vertical, upright side walls having a floor member extending generally horizontally therebetween. The tailgate assembly 10 extends transversely above the floor between the side walls at the rearwardmost portion of the cargo bed. The tailgate assembly 10 is pivotally mounted at the floor of the cargo bed and is movable between an upright closed position that is oriented perpendicularly to the floor and a lowered open position that forms an extension of the floor rearwardly of the side walls.

A supplemental tailgate apparatus 20 of the type shown and described in U.S. Pat. No. 6,918,624 can be stored within the interior of the tailgate assembly 10 until deployed with the tailgate assembly 10 lowered into the open position and the supplemental tailgate apparatus 20 oriented generally vertically to serve as a substitute tailgate while the top surface of the lowered tailgate assembly 10 serves as an extension of the cargo bed. The supplemental tailgate apparatus 20 is also pivotally movable into a lowered position such that the cross member 22 is lower than the main tailgate structure. As is disclosed in the aforementioned U.S. Pat. No. 6,918,624, the cross member 22 can also incorporate a flip-out step member (not shown) that enhances the use of the cross member 22 as a step.

With the supplemental tailgate 20 positioned below the main tailgate structure 10 to perform the step function of the supplemental tailgate 20, a user of the apparatus 20 can step upon the cross member 22, and any extended step member (not shown) if provided, and be assisted in making the next step on onto the inner panel (or top surface in the open position) 12 of the lowered tailgate assembly 10, thereby providing physical access to the cargo bed and anything stored thereon. Ingress onto the cargo bed, may be facilitated by the use of a grab handle assembly (not shown) by which the person steps onto the cross member 22 of the lowered supplemental tailgate apparatus 20 can be stabilized while ascending the supplemental tailgate 12 onto the top surface 12 of the lowered tailgate assembly 10. As disclosed in U.S. patent application Ser. No. 11/236,133, the grab handle assembly can be deployed to assist a person descending from the main tailgate assembly 10 to the surface of the ground through the use of the supplemental tailgate apparatus 20.

The supplemental tailgate apparatus 20 cannot be housed in a conventional tailgate as the enclosed structure of the tailgate will not allow the passage of the shaft or shafts connected to the cross member 22 or the guide tubes 25, which preferably receive the shafts, through the interconnected inner and outer panels 12, 14 and internal strainers, or transverse support members, 15, 18. Furthermore, the conventional assembled sheet metal tailgate assembly 10 would not have sufficient structural support for the mounting of a supplemental tailgate apparatus 20, particularly if used as a step function.

Referring to FIGS. 1-11, the structural configuration of the tailgate assembly 10 is modified to include an upper frame support, or reinforcement, member, preferably in the form of a C-channel 30, that extends transversely at or near the top of the tailgate assembly 10. The inner and outer panels 12, 14 can be connected to the reinforcement member, preferably in the form of the C-channel 30, by welding or by a hemming process in which the edges of the panel 12, 14 are folded over a vertical edge of the structural frame member 30 and crimped thereto. Preferably, the inner panel 12 is welded to the inside upright leg 31 of the C-channel 30, while the outer panel 14 is hemmed over top of the outside upright leg 33 of the C-channel 30. The lowermost web 34 of the C-channel 30 extending between the upright legs 31, 33 is oriented substantially horizontal (when the tailgate assembly 10 is in the closed, upright position, and forms a U-shaped cross-sectional configuration. The C-channel 30 is also formed with a flanged opening 36 in the web 34 for each guide tube 25 utilized in the supplemental tailgate apparatus 20.

Preferably, the tailgate assembly 10 is formed with a pair of transversely extending reinforcement members 15, 18, commonly referred to as "strainers", although some conventional tailgates are formed with only one strainer in the interior of the tailgate assembly 10. Preferably, the strainers 15, 18 are welded to the inner panel 12 and affixed to the outer panel 14 through adhesives. To accommodate the vertical passage of the guide tubes 25 through the strainers 15, 18, the strainers are formed with a flanged depression notch 16 to establish a passageway for the reception of the guide tube 25 therethrough. The formation of flanges extending generally vertically (perpendicularly to the major axis of the strainers 15, 18) minimizes scratching of the exterior coating placed on the guide tubes 25 while the guide tubes 25 are being installed into the tailgate assembly 10, providing a lead-in feature for the installation of the guide tubes 25. The guide tubes 25 can then pass from the C-channel 30 through the strainers 15, 18 to the bottom of the tailgate assembly where they can be detachably affixed by a bolt inserted through the hole 29. Alternatively, particularly if a reinforcement member (strainer) is placed at or near the bottom of the guide tube 25, the guide tube 25 can be detachably connected to the strainer to positionally fix the guide tube 25 within the tailgate assembly 10.

The top of each guide tube 25 is preferably affixed by welding to a mounting bracket 26 that is oriented generally perpendicularly to the vertical axis of the guide tube 25. The mounting bracket 26 has an opening 27 that is alignable with the interior of the guide tube 25 and alignable with the opening 36 in the C-channel. The mounting bracket 26 is also preferably formed with bolt holes 28 to permit the detachable connection of the mounting bracket 26 to the C-channel. Once the guide tube 25 and mounting bracket 26 are connected, the guide tube 25 can be inserted through the opening 36 in the C-channel and passed through the depression notches 16 in the strainers 15, 18 until the mounting bracket engages the web 34 of the C-channel. Connecting the mounting bracket 26 to the C-channel 25 with removable bolts enables the guide tubes to be removable for repair or replacement. The mounting bracket 26 includes support members 40 for the pivoting and deployment of the telescopic support shafts 21 of the supplemental tailgate apparatus 20.

The C-channel 30 can also support a mounting bracket 38 that is bolted to the underside of the web 34 using the fasteners connecting the corresponding mounting bracket 26 for the guide tube 25 to the top surface of the C-channel web 34. The grab handle mounting bracket 38 can also be bolted or welded to the top strainer 15. The grab handle mounting bracket 38 is formed in a manner to wrap around the corresponding guide tube 25 so as to avoid interference therewith and supports a mounting flange 39 for use in attaching and deploying the grab handle, as is described in the aforementioned U.S. patent application Ser. No. 11/236, 133.

Figures 9, 10:
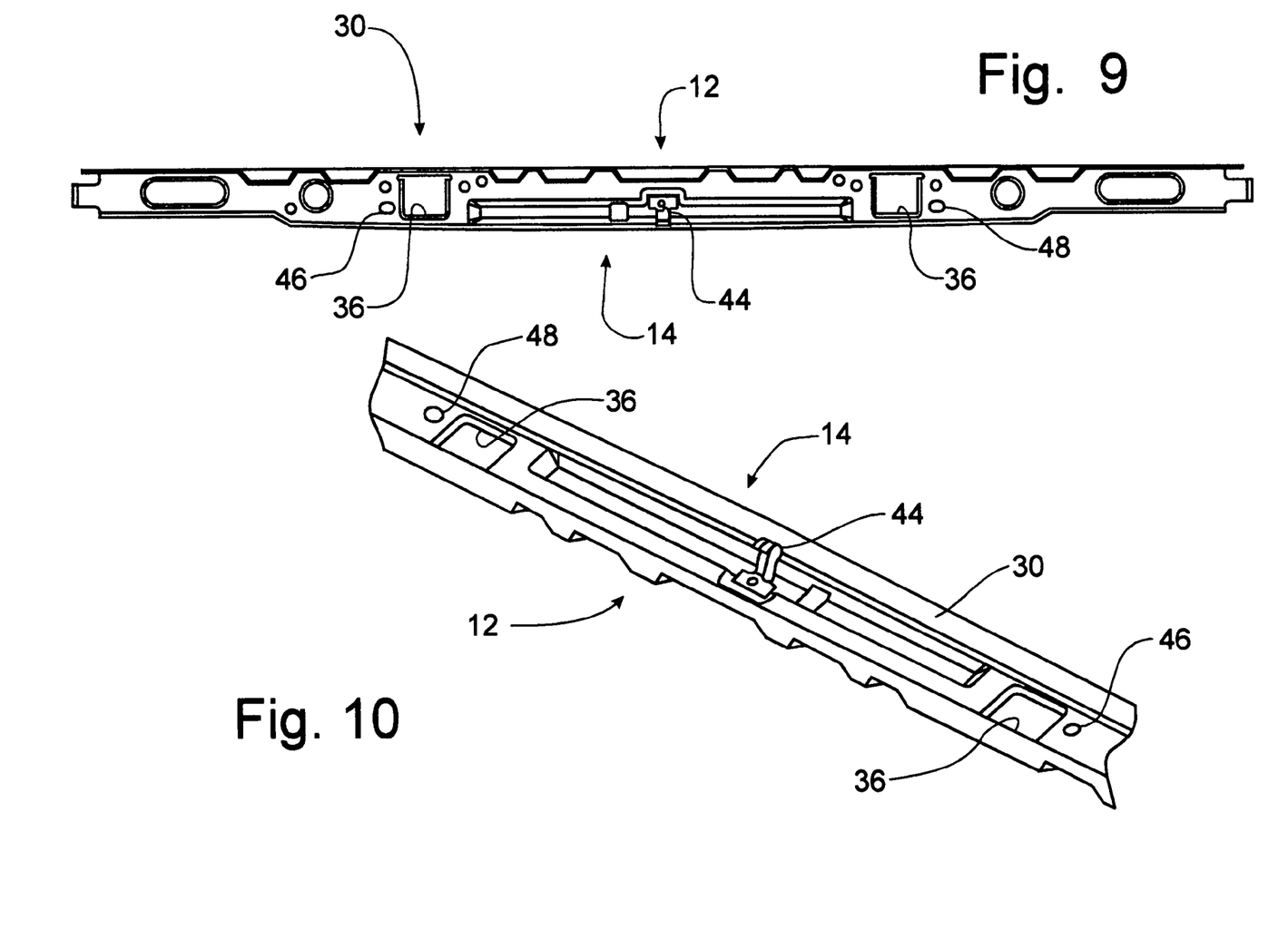
FIG. 9 is a top plan view of the C-channel member.
FIG. 10 is a upper perspective view of the central portion of the C-channel.
Figure 11:
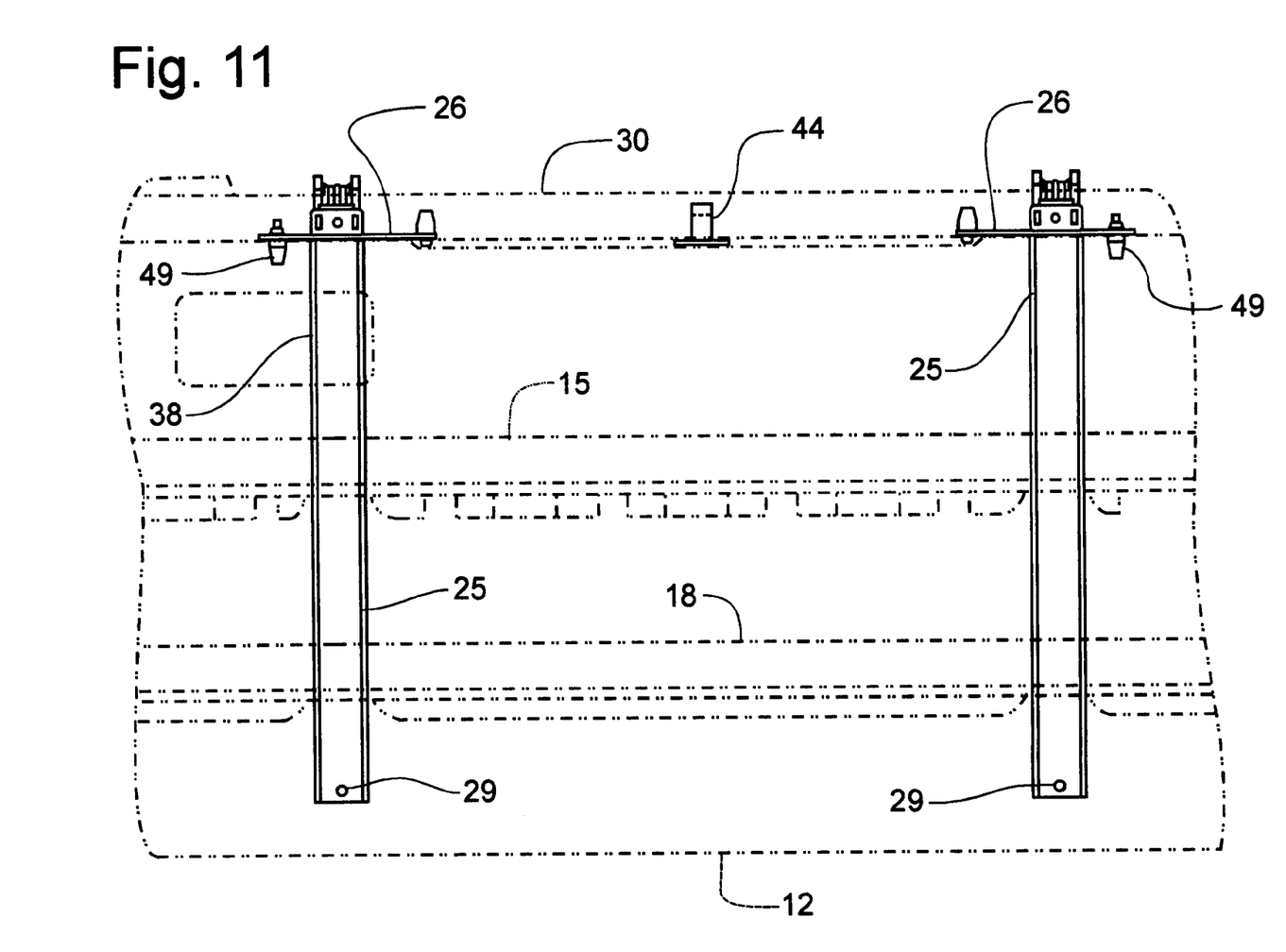
FIG. 11 is an enlarged elevational view of the guide tubes, mounting brackets and latch striker with the C-channel, strainers and outer shell of the tailgate being shown in phantom.

The upper reinforcement member 30, as is best seen in FIGS. 9-11, also serves to mount a striker 44 for a latch mechanism (not shown) that is formed as part of the supplemental tailgate apparatus 20, which retains the supplemental tailgate apparatus 20 in the stored position within the tailgate assembly 10 until extension thereof is desired. The C-channel 30 is also provided with locator holes 46, 48 adjacent to the flanged openings 36 for the passage of the guide tubes 25 to be cooperable with NAB (no-adjust build) pins 49 that are detachably mounted on the mounting bracket 26 and insertable within the locator holes 46, 48 to facilitate the proper positioning of the supplemental tailgate apparatus 20 for a flush fit with the exterior sheet metal of the tailgate assembly 10. Preferably, the NAB pins 49 are detachably fastened to the mounting bracket 26 within an oversize hole to permit positional adjustment thereof for proper seating and positioning of the NAB pin 49.

The modified tailgate assembly 10 is preferably formed by welding the inner panel 12 to the C-channel 30 and the strainers 15, 18. The assembled guide tubes 25 with mounting brackets 26 can be inserted through the flanged openings 36 in the C-channel 30 and through the flanged notches 16 of the strainers 15, 18. Fasteners (not shown) connect the mounting bracket 26 to the web 34 of the C-channel 30. These same fasteners (not shown) can also be used to mount the grab handle mounting bracket 38 to the underside of the web 34. An additional fastener (not shown) can be utilized to secure the bottom end of the guide tubes to the inner panel 12, or via a bracket (not shown) that can mount on the lower strainer 18. After the guide tubes 25 are secured, the outer panel 14 can be mounted on the assembly 10, preferably by hemming the edges around the corresponding edges of the inner panel 12, the outside upright leg 33 of the C-channel 30, and other appropriate conventional mounting structure (not shown). Once the supplemental tailgate apparatus 20 is installed, the tailgate assembly 10 is available for mounting on the pick-up truck.

One skilled in the art will recognize that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

For example, some pick-up truck tailgates are manufactured in a manner that a single piece of sheet metal is bent and folded to form both the inner and outer panels which can be joined at the top to establish the shell of the tailgate assembly defining the interior cavity thereof. Such tailgate configurations are intended to be encompassed within the modifications described herein. Furthermore, the upper frame support is preferably a C-channel oriented into a U-shaped position; however, one skilled in the art will understand that other formed frame support members can be utilized to provide similar features. Similarly, the tailgate assembly can utilize one, two or more reinforcement members, or strainers, within the interior of the tailgate shell.

Having thus described the invention, what is claimed is:

1. In a tailgate assembly for a pick-up truck including an inner panel and an outer panel defining an interior cavity therebetween, said tailgate being pivotally movable between an upright closed position and a lowered opened position, said tailgate assembly having a supplemental tailgate apparatus including shafts interconnected by a cross member, said shafts being received within said interior cavity of said tailgate assembly for extension from said interior cavity, said tailgate assembly further having a top portion and a bottom portion located below the top portion when said tailgate assembly is in said upright closed position, the improvement comprising:

a transversely extending frame member positioned proximate to said top portion of said tailgate assembly, said transversely extending frame member defining at least one opening receiving said shafts of said supplemental tailgate apparatus; and a mounting bracket detachably connected to said frame member corresponding to each said opening therein, each said mounting bracket having a passageway therein aligned with the corresponding opening in said frame member, said mounting bracket attached to said transversely extending frame member supporting said supplemental tailgate apparatus when extended from said tailgate assembly.

2. The tailgate assembly of claim 1 wherein said tailgate assembly further includes at least one reinforcement member positioned between said bottom portion of said tailgate assembly and said transversely extending frame member.

3. The tailgate assembly of claim 2 wherein said at least one reinforcement member defines at least one passageway positioned in alignment with said opening in said transversely extending frame member to receive said shafts of said supplemental tailgate apparatus when positioned within said interior cavity.

4. The tailgate assembly of claim 3 wherein each said passageway and each said opening for the receipt of said shafts of said supplemental tailgate apparatus are formed with flanges that extend in the direction of movement of said shafts of said supplemental tailgate apparatus.

5. The tailgate assembly of claim 1 wherein said frame member is a C-channel oriented with a lower web portion and front and rear upright legs extending generally vertically from said web portion, said mounting bracket being attached to said lower web portion.

6. The tailgate assembly of claim 5 wherein said web portion of said C-channel is formed with said at least one opening extending therethrough for communication with said shafts of said supplemental tailgate apparatus.

7. The tailgate assembly of claim 5 wherein said inner panel is affixed to said front upright leg and said outer panel is affixed to said rear upright leg.

8. The tailgate assembly of claim 6 wherein said C-channel detachably supports a mounting bracket for a grab handle device, said mounting bracket being formed in a configuration that wraps around said shaft.

9. The tailgate assembly of claim 8 wherein said C-channel is formed with at least one locator hole to receive a positioning pin mounted on said supplemental tailgate apparatus to control the positioning of said supplemental tailgate apparatus relative to said C-channel.

* * * * *